(12) United States Patent
Burrell et al.

(10) Patent No.: US 11,443,316 B2
(45) Date of Patent: Sep. 13, 2022

(54) PROVIDING IDENTIFICATION INFORMATION TO MOBILE COMMERCE APPLICATIONS

(71) Applicant: Equifax Inc., Atlanta, GA (US)

(72) Inventors: John Burrell, Woodinville, WA (US); Sekhar Dochibhotla, Ashburn, VA (US); Anand Krishnaswamy, Irving, TX (US); Robert Clark Fuller, Dacula, GA (US); Todd Duncan Hoover, Suwanee, GA (US)

(73) Assignee: EQUIFAX INC., Atlanta, GA (US)

( * ) Notice: Subject to any disclaimer, the term of this patent is extended or adjusted under 35 U.S.C. 154(b) by 230 days.

(21) Appl. No.: 16/146,256

(22) Filed: Sep. 28, 2018

(65) Prior Publication Data
US 2019/0034933 A1    Jan. 31, 2019

Related U.S. Application Data

(62) Division of application No. 14/512,493, filed on Oct. 13, 2014, now Pat. No. 10,115,102.
(Continued)

(51) Int. Cl.
*G06Q 20/40* (2012.01)
*G06Q 20/38* (2012.01)
(Continued)

(52) U.S. Cl.
CPC ..... *G06Q 20/4016* (2013.01); *G06Q 20/0855* (2013.01); *G06Q 20/12* (2013.01);
(Continued)

(58) Field of Classification Search
CPC .......... G06Q 20/4016; G06Q 20/0855; G06Q 20/12; G06Q 20/3227; G06Q 30/0631;
(Continued)

(56) References Cited

U.S. PATENT DOCUMENTS 5,960,411 A    9/1999   Hartman et al.
6,944,669 B1   9/2005   Saccocio
(Continued)

FOREIGN PATENT DOCUMENTS

CA      2413340 C      10/2009
KR      20130103697    9/2013
(Continued)

OTHER PUBLICATIONS

Molina et al., Database Systems The Complete Book , 2009, Pearson Prentice Hall Inc. (Year: 2009).*
(Continued)

*Primary Examiner* — John W Hayes
*Assistant Examiner* — Dennis G Keritsis
(74) *Attorney, Agent, or Firm* — Kilpatrick Townsend & Stockton LLP (57) ABSTRACT

Aspects and examples are disclosed for facilitating mobile commerce. In one example, a processing device receives a data network identifier or other identifier from a commerce application. The data network identifier or other identifier can be associated with a mobile device conducting a transaction with the commerce application. The processing device can also obtain a credential associated with the mobile device using the data network identifier. The processing device can additionally retrieve identification information from a credit file associated with the credential. The identification information can be useable for completing the transaction. The processing device can further transmit the identification information to a computing device executing the commerce application.

18 Claims, 6 Drawing Sheets

Related U.S. Application Data (60) Provisional application No. 61/890,419, filed on Oct. 14, 2013.

(51) Int. Cl.
| | | |
|---|---|---|
| *G06Q 20/08* | (2012.01) | |
| *G06Q 20/12* | (2012.01) | |
| *G06Q 20/32* | (2012.01) | |
| *G06Q 30/06* | (2012.01) | |
| *G06Q 30/02* | (2012.01) | |
| *H04L 9/40* | (2022.01) | |
| *G06Q 20/36* | (2012.01) | |

(52) U.S. Cl.
CPC ....... *G06Q 20/3227* (2013.01); *G06Q 20/363* (2013.01); *G06Q 20/3821* (2013.01); *G06Q 20/407* (2013.01); *G06Q 20/4014* (2013.01); *G06Q 30/0267* (2013.01); *G06Q 30/0631* (2013.01); *H04L 63/0853* (2013.01)

(58) Field of Classification Search
CPC ............ G06Q 30/0267; G06Q 20/363; G06Q 20/4014; G06Q 20/3821; G06Q 20/407
See application file for complete search history.

(56) References Cited

U.S. PATENT DOCUMENTS

| | | | | |
|---|---|---|---|---|
| 8,045,956 B2* | 10/2011 | Sun | ............ | H04M 15/68 |
| | | | | 455/406 |
| 8,121,941 B2* | 2/2012 | Matthews | .......... | G06Q 30/0226 |
| | | | | 705/39 |
| RE44,513 E | 10/2013 | Ryan et al. | | |
| 8,577,803 B2* | 11/2013 | Chatterjee | ............ | G06Q 20/386 |
| | | | | 705/41 |
| 8,996,423 B2* | 3/2015 | Johnson | ................. | G06Q 20/40 |
| | | | | 705/71 |
| 9,112,857 B2* | 8/2015 | Coppinger | ............. | G06Q 20/32 |
| 9,799,027 B2* | 10/2017 | Pasa | ............ | G06Q 20/367 |
| 10,115,102 B2 | 10/2018 | Burrell et al. | | |
| 10,863,359 B2 | 12/2020 | Talwar | | |
| 2003/0101136 A1* | 5/2003 | Wheeler | ............ | G06Q 20/341 |
| | | | | 705/42 |
| 2004/0006535 A1 | 1/2004 | Forbes, Jr. et al. | | |
| 2004/0122684 A1 | 6/2004 | Kaikuranta | | |
| 2004/0168054 A1 | 8/2004 | Halasz et al. | | |
| 2004/0177252 A1* | 9/2004 | Vallee | ............ | H04L 9/3247 |
| | | | | 713/170 |
| 2004/0230534 A1* | 11/2004 | McGough | ............ | G06Q 20/382 |
| | | | | 705/64 |
| 2004/0259626 A1* | 12/2004 | Akram | ............ | G07F 17/32 |
| | | | | 463/17 |
| 2005/0272465 A1* | 12/2005 | Ahmavaara | ............ | H04L 67/16 |
| | | | | 455/552.1 |
| 2006/0041755 A1 | 2/2006 | Pemmaraju | | |
| 2006/0233332 A1 | 10/2006 | Toms | | |
| 2006/0235761 A1* | 10/2006 | Johnson | ............ | G06Q 20/02 |
| | | | | 705/26.1 |
| 2006/0235796 A1 | 10/2006 | Johnson et al. | | |
| 2007/0178883 A1* | 8/2007 | Nandagopal | ............ | G06Q 20/322 |
| | | | | 455/411 |
| 2007/0244831 A1 | 10/2007 | Kuo | | |
| 2007/0255646 A1* | 11/2007 | Morris | ............ | G06Q 40/08 |
| | | | | 705/38 |
| 2007/0255662 A1* | 11/2007 | Tumminaro | ............ | G06Q 20/10 |
| | | | | 705/79 |
| 2007/0265928 A1 | 11/2007 | Fuchs et al. | | |
| 2008/0044031 A1* | 2/2008 | Mishra | ............ | H04L 9/0891 |
| | | | | 380/279 |
| 2009/0036111 A1 | 2/2009 | Danford et al. | | |
| 2009/0276368 A1 | 11/2009 | Martin et al. | | |
| 2009/0300097 A1 | 12/2009 | Meyer | | |
| 2010/0095359 A1 | 4/2010 | Gordon | | |
| 2010/0125737 A1 | 5/2010 | Kang | | |
| 2010/0218241 A1 | 8/2010 | Faryna | | |
| 2011/0238580 A1* | 9/2011 | Coppinger | ............ | G06Q 20/20 |
| | | | | 705/67 |
| 2011/0247045 A1 | 10/2011 | Rajagopal et al. | | |
| 2011/0270751 A1 | 11/2011 | Csinger et al. | | |
| 2011/0295750 A1 | 12/2011 | Rammal | | |
| 2011/0296513 A1 | 12/2011 | Kasad | | |
| 2011/0320347 A1* | 12/2011 | Tumminaro | ......... | G06Q 20/322 |
| | | | | 705/39 |
| 2012/0030110 A1 | 2/2012 | Prakash et al. | | |
| 2012/0150750 A1 | 6/2012 | Law et al. | | |
| 2012/0203605 A1 | 8/2012 | Morgan et al. | | |
| 2012/0209749 A1* | 8/2012 | Hammad | ............ | G06Q 20/3674 |
| | | | | 705/27.1 |
| 2012/0240204 A1 | 9/2012 | Bhatnagar et al. | | |
| 2012/0300932 A1 | 11/2012 | Davis et al. | | |
| 2012/0331532 A1 | 12/2012 | Walters et al. | | |
| 2013/0024371 A1* | 1/2013 | Hariramani | .......... | G06Q 20/384 |
| | | | | 705/41 |
| 2013/0226792 A1* | 8/2013 | Kushevsky | ............. | H04W 4/14 |
| | | | | 705/41 |
| 2013/0262311 A1 | 10/2013 | Buhrmann et al. | | |
| 2013/0309999 A1 | 11/2013 | Modiano | | |
| 2014/0109175 A1 | 4/2014 | Barton et al. | | |
| 2014/0122226 A1 | 5/2014 | Downing et al. | | |
| 2014/0136346 A1* | 5/2014 | Teso | ................. | G06Q 20/384 |
| | | | | 705/14.72 |
| 2014/0258136 A1 | 9/2014 | Ellis | | |
| 2014/0279523 A1* | 9/2014 | Lynam | ................ | G06Q 20/401 |
| | | | | 705/44 |
| 2014/0282897 A1 | 9/2014 | Stuntebeck | | |
| 2015/0026049 A1* | 1/2015 | Theurer | ............... | G06Q 20/405 |
| | | | | 705/41 |
| 2015/0046339 A1 | 2/2015 | Wong et al. | | |
| 2015/0088751 A1 | 3/2015 | Grigg et al. | | |
| 2015/0106270 A1 | 4/2015 | Burrell et al. | | |
| 2015/0149359 A1 | 5/2015 | Forte | | |
| 2015/0350177 A1 | 12/2015 | Sharp et al. | | |
| 2016/0171555 A1 | 6/2016 | Buerger et al. | | |
| 2016/0277380 A1 | 9/2016 | Wagner et al. | | |
| 2016/0300231 A1 | 10/2016 | Shavell et al. | | |
| 2016/0381038 A1 | 12/2016 | Disraeli | | |
| 2017/0178142 A1* | 6/2017 | Dutt | ............ | G06Q 50/265 |
| 2017/0221055 A1 | 8/2017 | Carlsson et al. | | |
| 2018/0204234 A1 | 7/2018 | Hermoni et al. | | |
| 2020/0145385 A1 | 5/2020 | Chauhan et al. | | |
| 2021/0044976 A1 | 2/2021 | Wetisov et al. | | |

FOREIGN PATENT DOCUMENTS

| | | | | |
|---|---|---|---|---|
| KR | 1020130103697 | | 9/2013 | |
| WO | 2006113834 | | 10/2006 | |
| WO | 2010088757 | | 8/2010 | |
| WO | WO-2013166507 A1 * | 11/2013 | ........... | G06Q 20/027 |
| WO | 2013181151 | | 12/2013 | |
| WO | 2015057538 | | 4/2015 | |

OTHER PUBLICATIONS

Burra Venkata Durga Kumar, An Overview of Hypertext Transfer Protocol service Security on Business Domain, 2012 International Conference on Management and Education Innovation IPEDR vol. 37 (2012) © (2012) IACSIT Press, Singapore (Year: 2012).*
AU2014334713, "Third Examination Report", dated Apr. 30, 2020, 4 pages.
EP14853685.7, "Summons to Attend Oral Proceedings", Apr. 6, 2020, 23 pages.
EP14853685.7, "Office Action", dated Sep. 13, 2018, 7 pages.
U.S. Appl. No. 14/512,493, "Final Office Action", dated Apr. 30, 2018, 11 pages.
U.S. Appl. No. 14/512,493, "Non-Final Office Action", dated Jul. 14, 2017, 17 pages.
U.S. Appl. No. 14/512,493, "Notice of Allowance", dated Jun. 29, 2018, 18 pages.
EP14853685.7, "Extended European Search Report", dated Mar. 10, 2017, 7 pages.

(56) References Cited

OTHER PUBLICATIONS

PCT/US2014/060217, "International Search Report and Written Opinion", dated Jan. 12, 2015, 11 pages.
AU2014334713, "First Examination Report", dated May 1, 2019, 4 pages.
AU2014334713, "Second Examination Report", dated Dec. 24, 2019, 4 pages.
EP14853685.7, "Summons to Attend Oral Proceedings", dated Aug. 13, 2019, 10 pages.
EP14853685.7, "Summons to Attend Oral Proceedings", dated Nov. 15, 2019, 18 pages.
IN201637008409, "First Examination Report", dated Nov. 28, 2019, 6 pages.
PCT/US2018/027518, "International Search Report and Written Opinion", dated Jul. 26, 2018, 17 pages.
U.S. Appl. No. 16/160,639, "Final Office Action", dated Feb. 8, 2021, 13 pages.
U.S. Appl. No. 16/160,639, Non-Final Office Action dated Oct. 30, 2020, 13 pages.
U.S. Appl. No. 16/328,595, Notice of Allowance dated Aug. 19, 2020, 18 pages.
U.S. Appl. No. 16/328,595, Notice of Allowance dated Jun. 25, 2020, 26 pages.
Australian Application No. AU2018291152, First Examination Report dated Dec. 21, 2020, 4 pages.
Canadian Application No. CA2,924,009, Office Action dated Dec. 29, 2020, 3 pages.
Canadian Application No. CA3,067,821, Notice of Allowance dated Jan. 6, 2021, 1 pages.
European Application No. EP18784109.3, Extended European Search Report dated Nov. 2, 2020, 9 pages.
International Application No. PCT/US2014/060217, International Preliminary Report on Patentability dated Apr. 28, 2016, 8 pages.
International Application No. PCT/US2018/027518, International Preliminary Report on Patentability dated Oct. 24, 2019, 12 pages.
International Application No. PCT/US2018/040055, International Preliminary Report on Patentability dated Jan. 9, 2020, 8 pages.
International Application No. PCT/US2018/040055, International Search Report and Written Opinion dated Nov. 14, 2018, 12 pages.
International Application No. PCT/US2018/065376, International Preliminary Report on Patentability dated Jun. 25, 2020, 10 pages.
International Application No. PCT/US2018/065376, International Search Report and Written Opinion dated Mar. 25, 2019, 14 pages.
Australian Patent Application No. 2018291152, "Second Examination Report", dated Apr. 26, 2021, 3 pages.
Australian Patent Application No. 2020202925, "First Examination Report", dated Jun. 23, 2021, 6 pages.
European Patent Application No. 18822628.6, "Extended European Search Report", dated Feb. 23, 2021, 9 pages.
European Patent Application No. 21159404.9, "Extended European Search Report", dated Mar. 31, 2021, 10 pages.
U.S. Appl. No. 16/160,639, "Non-Final Office Action", dated Oct. 28, 2021, 17 pages.
U.S. Appl. No. 16/500,788, "Non-Final Office Action", dated Oct. 4, 2021, 14 pages.
Australian Patent Application No. 2018291152, "Notice of Acceptance", dated Oct. 27, 2021, 3 pages.
Australian Patent Application No. 2018291152, "Third Examination Report", dated Sep. 21, 2021, 2 pages.
Canadian Patent Application No. 2,924,009, "Office Action", dated Oct. 13, 2021, 2 pages.
U.S. Appl. No. 16/160,639, "Final Office Action", dated Apr. 8, 2022, 18 pages.
U.S. Appl. No. 16/500,788, "Notice of Allowance", dated Mar. 10, 2022, 7 pages.
U.S. Appl. No. 16/772,568, "Non-Final Office Action", dated Jan. 18, 2022, 14 pages.
Australian Patent Application No. 2018253294, "First Examination Report", dated Dec. 23, 2021, 4 pages.
Australian Patent Application No. 2020202925, "Second Examination Report", dated Dec. 24, 2021, 4 pages.
European Patent Application No. 18822628.6, "Notice of Decision to Grant", dated Mar. 24, 2022, 2 pages.
Vielhauer, "Fundamentals in User Authentication: Techniques for Binding Identities to Information", Biometric User Authentication for it Security: From Fundamentals to Handwriting, 2006, pp. 77-115.
U.S. Appl. No. 16/160,639, "Advisory Action", dated Jun. 14, 2022, 5 pages.
U.S. Appl. No. 16/500,788, "Notice of Allowance", dated Jun. 2, 2022, 7 pages.
U.S. Appl. No. 16/772,568, "Notice of Allowance", dated May 5, 2022, 11 pages.
U.S. Appl. No. 16/772,568, "Supplemental Notice of Allowability", dated May 18, 2022, 4 pages.
Australian Patent Application No. 2020202925, "Third Examination Report", dated May 31, 2022, 5 pages.
European Patent Application No. 18784109.3, "Notice of Decision to Grant", dated Jun. 17, 2022, 2 pages.

* cited by examiner

PROVIDING IDENTIFICATION INFORMATION TO MOBILE COMMERCE APPLICATIONS

CROSS-REFERENCE TO RELATED APPLICATIONS

The present application is a division of U.S. patent application Ser. No. 14/512,493 filed on Oct. 13, 2014, which claims the benefit of U.S. Provisional Application No. 61/890,419 filed on Oct. 14, 2013, both of which are hereby incorporated by reference in their entirety.

TECHNICAL FIELD

This disclosure relates generally to computer hardware (including mobile computing devices) and methods implemented on such computer hardware, and more particularly to providing identification information to a mobile commerce application.

BACKGROUND

With the rise in mobile device popularity, buying, selling, and obtaining services or commodities via mobile devices (i.e., "mobile commerce") has become more prevalent. To engage in a mobile transaction with a merchant or other entity, a consumer may input his or her name, address, credit card information, and other information into a mobile application. However, small screens on mobile devices and server connectivity issues can make entering such information difficult. Users may give up in the middle of a mobile transaction, reducing the conversion rate for such transactions. Further, users may have to manually input each of their credit cards individually into the mobile application to be able to use those credit cards for a mobile transaction. Users that fail to input all of their credit cards may be unable to use at least some of their credit cards while engaging in mobile transactions. Prior solutions may therefore fail to provide a frictionless and intuitive user interface through which a user can engage in mobile commerce.

SUMMARY

Aspects and examples are disclosed for providing identification information to a mobile commerce application executed by a computing device. In one example, one or more processing devices, such as (but not limited to) one or more servers, receive a data network identifier or other identifier from a computing device (e.g., a smart phone or other mobile communication device) that executes a commerce application (e.g., a dedicated application or a web-based application used for providing or obtain products or services). The data network identifier or other identifier can be associated with a mobile device that is conducting a transaction with the commerce application. The processing device can also use the data network identifier or other identifier to obtain a credential associated with the mobile device. The processing device can also retrieve identification information from a credit file associated with the credential. The identification information can be used for completing the transaction that is being conducted by the mobile device.

This illustrative example is mentioned not to limit or define the invention, but to aid understanding thereof. Other aspects, advantages, and features of the present invention will become apparent after review of the entire description and figures, including the following sections: Brief Description of the Figures, Detailed Description, and Claims.

BRIEF DESCRIPTION OF THE FIGURES

These and other features, aspects, and advantages of the present disclosure are better understood when the following Detailed Description is read with reference to the accompanying drawings, wherein.

DETAILED DESCRIPTION

Aspects and examples are disclosed for using a mobile commerce facilitation system to simplify mobile commerce transactions (e.g., via a mobile website or other mobile application) between providers of products or services and clients that consume or otherwise use the products or services. Mobile computing devices, such as (but not limited to) smart phones, are often associated with an individual (e.g., an owner of the smart phone). In some aspects, using a mobile commerce facilitation system to simplify mobile commerce transactions can allow for an identifier of a mobile device to be used as a proxy for the identity of a user of the mobile device.

In accordance with some aspects, a mobile commerce facilitation system is provided. For example, the mobile commerce facilitation system can be used by a credit bureau or credit reporting agency. The mobile commerce facilitation system can receive a data network identifier associated with a mobile device (e.g., a mobile phone, tablet, e-reader, or laptop computer) conducting a mobile transaction. Non-limiting examples of the data network identifier can include one or more of an internet protocol ("IP") address, a telephone number associated with a mobile device such as a smart phone, an identifier of an individual associated with the mobile device or an account associated with the mobile device (e.g., the identity of a user associated with a telephone number), etc. In some aspects, a mobile device may identify a user of the mobile via biometrics, data entry, or any other suitable process for identifying a user of a mobile device. The mobile device can provide the identity of the user with the data network identifier. The mobile commerce facilitation system can receive the data network identifier from a computing device executing a commerce application (i.e., an application for engaging in mobile commerce).

In some aspects, the mobile commerce facilitation system can use the data network identifier to obtain a credential associated with the mobile device. For example, the mobile commerce facilitation system can transmit the data network identifier to a telecommunication system. The telecommunication system can receive the data network identifier and determine a credential associated with the data network identifier. A non-limiting example of such an associated credential is a legal name of an individual that is associated with an IP address or other data network identifier. The telecommunication system can transmit the credential to the mobile commerce facilitation system via a suitable data network. The mobile commerce facilitation system can receive the credential via the data network.

In some aspects, the mobile commerce facilitation system can retrieve identification information from a credit file or other data source that is associated with the credential. For example, the mobile commerce facilitation system can determine identification information such as (but not limited to) one or more of a name, address, a credit card number, a social security number, a date of birth, and other personal attributes from a credit file associated with the credential. The identification information can be used for completing the transaction.

In some aspects, the mobile commerce facilitation system can transmit the identification information via a suitable data network to a computing device that executes the commerce application.

As used herein, the term "mobile commerce application" can be used refer to any application or groups of applications that can be used to buy, sell, provide, and/or receive products and/or services via the Internet and/or other suitable data networks. The services can be used for a whole range of mobile services (account origination, commerce, credit-decisioning, fraud etc.) and in some online services as well.

As used herein, the term "client" can refer to any individual or other entity that may purchase, consume, or otherwise utilize a product or service that can be obtained from a provider.

As used herein, the term "provider" can refer to any individual or other entity that may manufacture, sell, perform, or otherwise provide access to a product or a service. In some aspects, a provider can be an individual or entity who provides a product or service under conditions in addition to receiving payment from the client. Non-limiting examples of a provider include retailers, automobile dealers, insurers, merchants, financial institutions, etc.

As used herein, the term "identification information" can refer to any information that can be used to uniquely identify an individual or other entity. In some aspects, identification information can include information that can be used on its own to identify an individual or entity. Non-limiting examples of such identification information include one or more of a legal name, a company name, a social security number, a credit card number, a date of birth, an e-mail address, etc. In other aspects, identification information can include information that can be used in combination with other information to identify an individual or entity. Non-limiting examples of such identification information include a street address or other geographical location.

As used herein, the term "data network identifier" can refer to any information that can be used to uniquely identify a computing device (e.g., a mobile device) on a data network. In some aspects, a data network identifier can include information that can be used on its own to identify a computing device (e.g., an IP address). In other aspects, a data network identifier can include information that can be used in combination with other information to identify a computing device.

As used herein, the term "credential" can refer to any information that can be used to uniquely identify a credit file or other data source including identification information of an individual or other entity. In some aspects, a credential can include information that can be used on its own to identify the credit file or other data source including identification information of an individual or entity. Non-limiting examples of such a credential include one or more of an account number, a legal name, an address, a social security number, a credit card number, etc.

As used herein, the term "credit file" can refer to a historical report associated with the credit of an individual or entity. In some aspects, a credit file can be prepared or provided by a credit bureau. In some aspects, a credit file can include one or more of identification information, a credit card account, a loan, a bankruptcy, a late payment, an inquiry, a credit score, a credit card number, etc. In some aspects, a credit file can include additional data from data sources other than credit reporting data to augment the credit reporting data. Non-limiting examples of such additional data includes information obtained from utility providers, information obtained from wireless service providers, information obtained from credit card issuers, real estate data, etc.

In some aspects, the mobile commerce facilitation system can identify and authenticate a client based on the client's mobile device. For example, the mobile commerce facilitation system can transmit a data network identifier associated with the client's mobile device to a telecommunication system or provider. The telecommunication system or provider can receive the data network identifier and determine identification information (e.g., the client's name, address, social security number, zip code, or other information) associated with the data network identifier. The telecommunication system can transmit the identification information to the mobile commerce facilitation system. The mobile commerce facilitation system can receive and use the identification information to identify or authenticate the client or the client's mobile device.

In some aspects, the mobile commerce facilitation system can provide the identification information to the client's mobile device. The mobile device can use the identification information to, for example, populate data fields in a purchase order form for a transaction. Automatically populating purchase form fields can simplify the mobile transaction for the client.

In some aspects, the mobile commerce facilitation system can further provide information to the client's mobile device about credit cards, store cards, or other credit accounts that the client has associated with his or her credit file. The client can select a desired card or other credit account for the transaction. The presentation of credit card information, store card information, or other credit account information from the client's credit file can simplify a mobile transaction for the client. For example, the client may not need to input the credit cards or store cards or to have physical access to the credit cards or store cards for a transaction.

In some aspects, the client does not have to register and store any credit cards on a provider's website or in a mobile device to have access to the credit cards for a transaction. Rather, the mobile commerce facilitation system can dynamically provide the client with his or her associated credit cards during each transaction, as described above. Dynamically providing the client with his or her associated credit cards during each transaction can increase data security. The client can see and choose from multiple credit cards. The client can select a credit card to use for a particular transaction. In some aspects, the credit card data or other identification information used to complete a transaction is not stored on the mobile device or on a system other than the mobile commerce facilitation system (e.g., a system storing the user's credit file). The mobile commerce facilitation system can dynamically provide the identification information for each transaction. After systems other than the mobile commerce facilitation system (e.g., the mobile device or a system associated with a provider of products or services) have used the identification information for the transaction, the systems other than the mobile commerce facilitation system can delete the identification information.

In some aspects, the mobile commerce facilitation system can facilitate offering a credit card, store card, or other product or service to a client after performing a pre-screen of the client (e.g., the client's credit) contemporaneously with a transaction. Doing so can facilitate the process through which a client can purchase the credit card, store card, or other product or service (e.g., financial products or services).

The features discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general-purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

A commerce application can be used to facilitate purchasing or otherwise obtain products and/or services. Non-limiting examples of a commerce application can include an application for purchasing products or services, applying for a loan, applying for a credit card, or applying for a checking account, etc.

Figure 1:
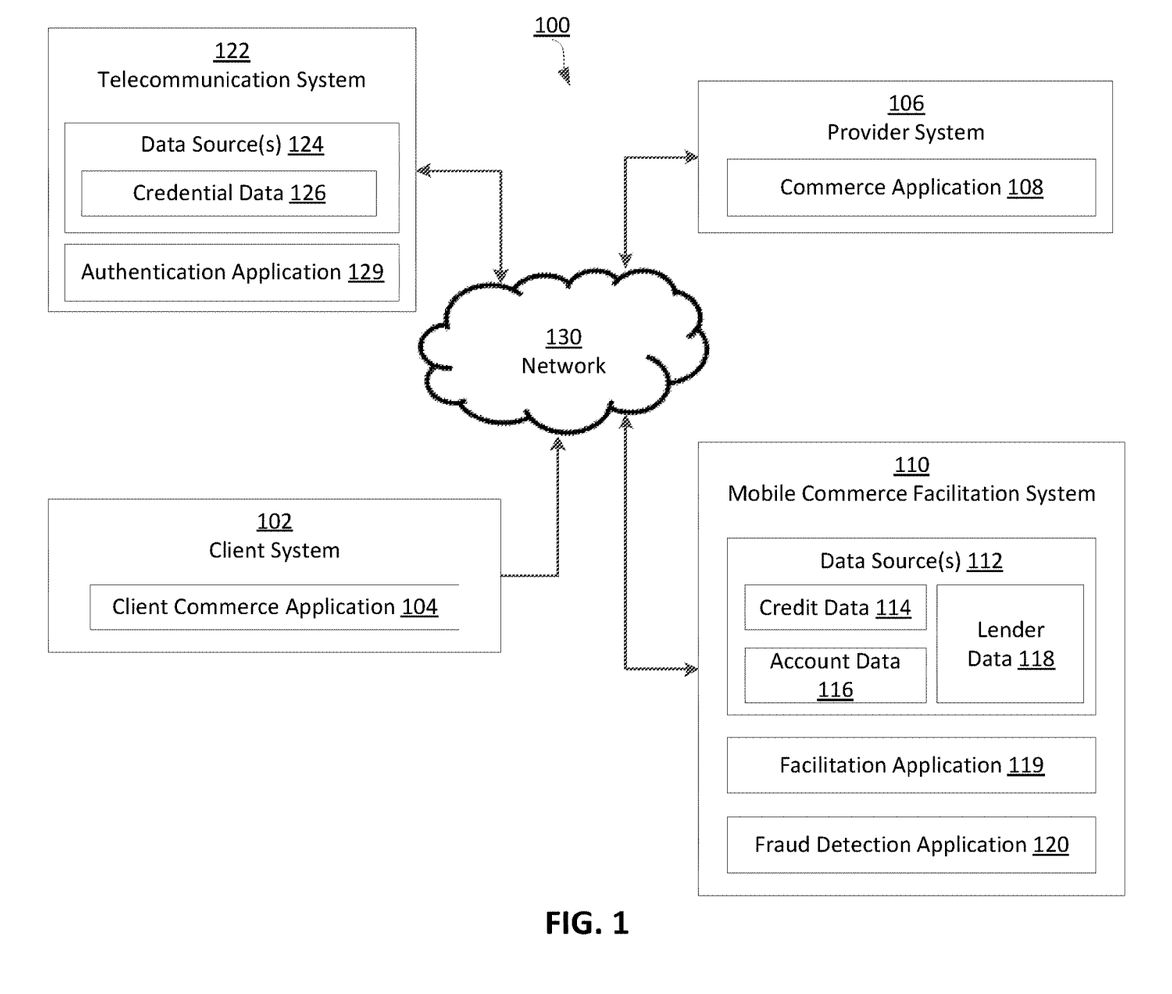
FIG. 1 is a block diagram illustrating an example of a system for facilitating mobile commerce according to some aspects of the present disclosure.

Referring now to the drawings, FIG. 1 is a block diagram illustrating an example of a system for facilitating mobile commerce according to some aspects of the present disclosure. The mobile commerce facilitation system 110 can include one or more server devices. The one or more server devices can include or can otherwise access one or more non-transitory computer-readable media. One or more of the data sources 112, the facilitation application 119, and the fraud detection application 120 can be stored on the non-transitory computer-readable media. The mobile commerce facilitation system 110 can also include one or more processing devices that are capable of executing one or more of the facilitation application 119 and the fraud detection application 120 to perform operations described herein. Examples of hardware and software components included within the mobile commerce facilitation system 110 are further described with respect to FIG. 2.

The data sources 112 can be stored in, for example, a database or other suitable data source. The data sources 112 can include, for example, secure and credentialed databases or other data structures managed by or otherwise accessible by the facilitation application 119. The data sources 112 can include internal databases or other data sources that are stored at or otherwise accessible to the mobile commerce facilitation system 110.

FIG. 1 depicts the data sources 112 as being stored at the mobile commerce facilitation system 110 for illustrative purposes only. Other implementations are possible. For example, the data sources 112 can also include external databases that are accessible to the mobile commerce facilitation system 110 via one or more suitable data networks. In some aspects, the data sources 112 can be data storage devices controlled by the owner or operator of the mobile commerce facilitation system 110. In other aspects, the internal or external databases can be controlled by an entity other than the owner of the mobile commerce facilitation system 110.

In some aspects, the data sources 112 can include credit data 114. Credit data 114 can include data associated with a client's credit file. For example, credit data 114 can include one or more of a client's name, address, social security number, credit score, one or more credit card numbers, etc. The data sources 112 can also include account data 116. Account data 116 can include data associated with a client's credit account. For example, account data 116 can include a client's name, address, an account number, authentication information (e.g., a personal identification number, a password, etc.), a username, etc. The data sources 112 can further include lender data 118. Lender data 118 can include data associated with lenders of credit or money, or other financial product or service providers. For example, lender data 118 can include data associated with a bank, trust, credit union, insurance company, brokerage firm, etc. The data sources 112 can also include any other relevant data, such as income and employment data, asset data, education data, etc. In some aspects, data from multiple data sources 112 can be linked to or otherwise associated with a given client using a referential keying system. The data sources 112 can be updated periodically or continuously.

The facilitation application 119 can execute one or more processes for facilitating mobile commerce transactions. The facilitation application 119 can include executable instructions stored in one or more non-transitory computer-readable media. In some aspects, the facilitation application 119 can include one or more modules, such as a web server module, a web services module, or an enterprise services module, which individually or in combination facilitate mobile commerce transactions. For example, a web server module can be executed by a suitable processing device to provide one or more web pages or other interfaces to a client system 102, provider system 106, or telecommunication system 122. The web pages or other interfaces can include content provided by the web services module. The web services module can generate this content by executing one or more algorithms using information retrieved from one or more of the data sources 112. The enterprise services module can be executed to retrieve the information from one or more of the data sources 112.

The fraud detection application 120 can execute one or more processes for detecting a fraudulent transaction. The fraud detection application 120 can include executable instructions stored in one or more non-transitory computer-readable media. In some aspects, the fraud detection application 120 can be executed by a suitable processing device to compare credit data 114 or account data 116 with data provided by one or more of the client system 102, the provider system 106, and the telecommunication system 122. The fraud detection application 120 can use the results of the comparison to detect data inaccuracies or questionable transaction behavior that may signify fraud. The fraud detection application 120 can provide the provider system 106 with a warning if fraud is detected.

The mobile commerce facilitation system 110 can electronically communicate with one or more client systems 102, provider systems 106, and telecommunication systems 122 via one or more data networks 130. The communications over these data networks 130 can be performed using any communication protocol or group of communication protocols suitable for establishing one or more secure communication links.

In some aspects, the mobile commerce facilitation system 110 can implement one or more procedures to secure communications between the mobile commerce facilitation system 110 and a client system 102, provider system 106, or a telecommunication system 122. Non-limiting examples of features provided to protect data and transmissions between the mobile commerce facilitation system 110 and the client system 102, provider system 106, or the telecommunication system 122 include secure web pages, encryption, firewall protection, network behavior analysis, intrusion detection, etc. In some aspects, transmissions with client systems 102, provider systems 106, or telecommunication systems 122 can be encrypted using public key cryptography algorithms using a minimum key size of 128 bits. In additional or alternative aspects, website pages can be delivered through HTTPS or other secure server communications protocols. In additional or alternative aspects, electronic communications can be transmitted using Secure Sockets Layer ("SSL") technology or other suitable secure protocols. Extended Validation SSL certificates can be utilized to clearly identify a website's organization identity. In another non-limiting example, physical, electronic, and procedural measures can be utilized to safeguard data from unauthorized access and disclosure.

The mobile commerce facilitation system 110 can communicate with one or more client systems 102, provider systems 106, and telecommunication systems 122 by applying authentication and authorization rules. The authentication and authorization rules can be used to authenticate and authorize the client system 102, provider system 106, or telecommunication system 122 to receive information from the mobile commerce facilitation system 110. The mobile commerce facilitation system 110 can communicate with the client system 102, provider system 106, or the telecommunication system 122 through a data network 130 or other information exchange.

The client system 102 can include any computing device or other communication device operated by a consumer, a buyer, or other client. The client system 102 can include one or more client commerce applications 104. The one or more client commerce applications 104 can include executable instructions stored in one or more non-transitory computer-readable media. The client system 102 can also include one or more processing devices that are capable of executing the client commerce application 104 to perform operations described herein. In some aspects, the client commerce application 104 can provide an interface (e.g., a web browser or a mobile application) through which a client can engage in mobile commerce with a provider. A client or other entity accessing the client system 102 can use the client commerce application 104 to engage in a transaction with a provider (e.g., a provider accessible via a mobile application or web-based application accessible via mobile device, a provider accessible via an online system such as a website, etc.).

A provider system 106 can include any computing device or group of computing devices operated by a seller, lender, or other provider of products or services. The provider system 106 can include one or more server devices. The one or more server devices can include or can otherwise access one or more non-transitory computer-readable media. The provider system 106 can also include a commerce application 108. The commerce application 108 can include executable instructions stored in one or more non-transitory computer-readable media. The provider system 106 can further include one or more processing devices that are capable of executing the commerce application 108 to perform operations described herein. In some aspects, the commerce application 108 can provide an interface (e.g., a website, web server, or other server) to engage in mobile commerce with a client. The commerce application 108 may transmit data to and receive data from the client commerce application 104 to enable a transaction.

A telecommunication system 122 can include any computing device or group of computing devices operated by a telecommunications or wireless network provider. The telecommunication system 122 can include one or more server devices. The one or more server devices can include or can otherwise access one or more non-transitory computer-readable media. An authentication application 129 or one or more data sources 124 can be stored in one or more non-transitory computer-readable media. The data sources 124 can have any of the structures or configurations described with respect to the data sources 112 of the mobile commerce facilitation system 110. The telecommunication system 122 can also include one or more processing devices that are capable of executing the authentication application 129 to perform operations described herein. In some aspects, the authentication application 129 can provide an interface through which the mobile commerce facilitation system 110 can acquire credential data 126 from the telecommunication system 122. Credential data 126 can include data associated with a telecommunications account (e.g., a client's telecommunications account). For example, credential data 126 can include a legal name, a social security number, a credit card number, an account number, an address, a mobile phone number, a mobile account number, a proxy to a mobile account number, etc.

In some aspects, the mobile commerce facilitation system 110 can use data in addition to or instead of data provided by the telecommunication system 122. For example, an identifier of a user of a mobile device can be obtained using biometrics, scanning an identity card, or any other process that a computing device can use to identify a user. Identifier of the user can be provided to the mobile commerce facilitation system 110.

Figure 2:
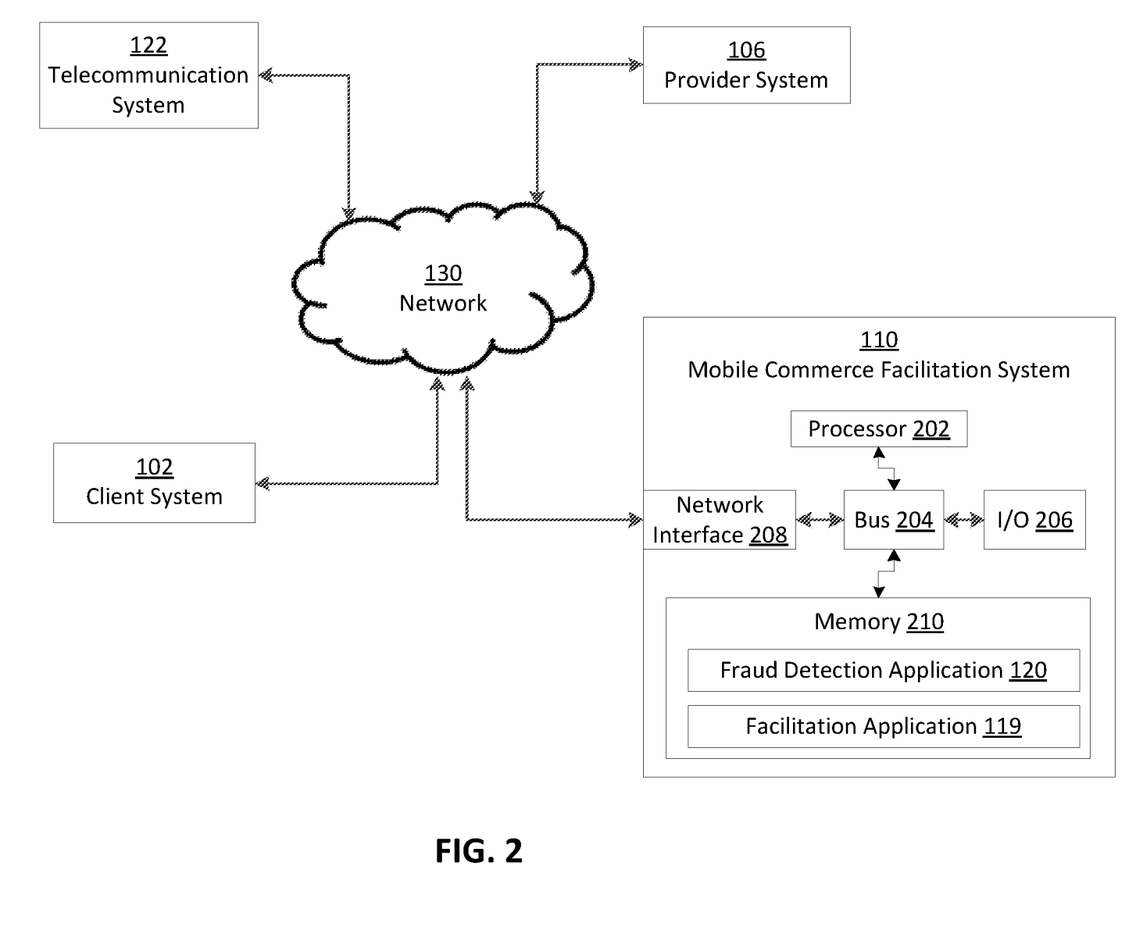
FIG. 2 is a block diagram depicting an example of a mobile commerce facilitation system depicted in FIG. 1 according to some aspects of the present disclosure.

FIG. 2 is a block diagram depicting an example of a mobile commerce facilitation system 110 depicted in FIG. 1 according to some aspects of the present disclosure. FIG. 2 depicts the mobile commerce facilitation system 110 as one device for illustrative purposes only. Other implementations are possible. For example, any suitable computing system or group of computing systems can be used to implement the mobile commerce facilitation system 110.

The mobile commerce facilitation system 110 can include a processor 202 that is communicatively coupled to a memory 210. The processor 202 can execute computer-executable program instructions and/or access information stored in the memory 210. The processor 202 can include any of a number of processing devices, including one. The processor 202 can include or may be communicatively coupled with a computer-readable medium such as a memory 210 that stores instructions. The processor 202 can execute the instructions stored in the memory 210 and thereby perform one or more operations described herein. Non-limiting examples of the processor 202 include a microprocessor, an application-specific integrated circuit ("ASIC"), a state machine, or any other suitable processing device or group of processing devices.

The memory 210 can include any suitable computer-readable medium. The computer-readable medium can include any electronic, optical, magnetic, or other storage device capable of providing a processor 202 with computer-readable instructions or other program code. Non-limiting examples of a computer-readable medium include a floppy disk, CD-ROM, DVD, magnetic disk, memory chip, ROM, RAM, an ASIC, a configured processor, optical storage, magnetic tape or other magnetic storage, or any other medium from which a processor 202 can read instructions. The instructions may include processor-specific instructions generated by a compiler and/or an interpreter from code written in any suitable computer-programming language, including, for example, C, C++, C#, Visual Basic, Java, Python, Perl, JavaScript, and ActionScript.

The mobile commerce facilitation system 110 may also include a number of external or internal devices such as input or output devices (not shown). For example, the mobile commerce facilitation system 110 is shown with an input/output ("I/O") interface 206 that can receive input from input devices or provide output to output devices. A bus 204 can also be included in the mobile commerce facilitation system 110. The bus 204 can communicatively couple one or more components of the mobile commerce facilitation system 110.

The mobile commerce facilitation system 110 can execute program code for the facilitation application 119. The program code for the facilitation application 119 can reside on any suitable computer-readable medium and may be executed on any suitable processing device. The program code for the facilitation application 119 can reside in the memory 210 of the mobile commerce facilitation system 110. The facilitation application 119 stored in the memory 210 can configure the processor 202 to perform the operations described herein.

The mobile commerce facilitation system 110 can also include at least one network interface 208. The network interface 208 can include any device or group of devices suitable for establishing a wired or wireless data connection to one or more data networks 130. Non-limiting examples of the network interface 208 include an Ethernet network adapter, a modem, and/or the like. The network interface 208 can transmit signals that are modulated with or otherwise include data generated by one or more of the facilitation application 119, the fraud detection application 120, or other applications executed by the processor 202. The network interface 208 can receive signals that are modulated with or otherwise include data that can be used by one or more of the facilitation application 119, the fraud detection application 120, or other applications executed by the processor 202.

Figure 3:
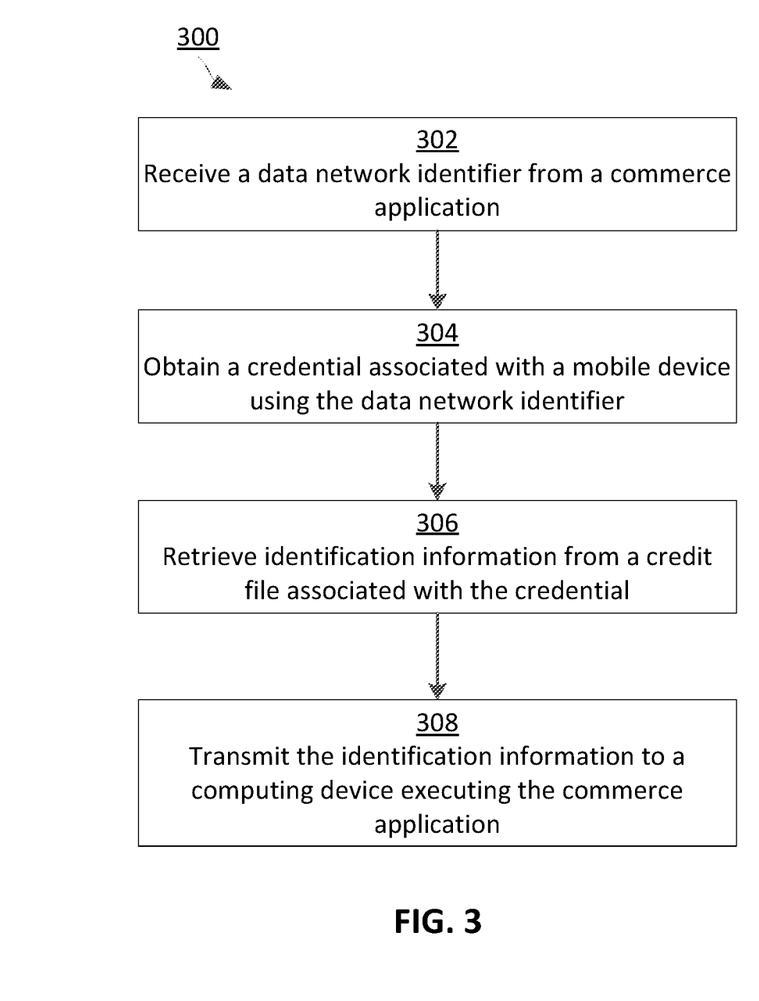
FIG. 3 is a flow chart illustrating an example of a process for using the mobile commerce facilitation system of FIGS. 1 and 2 to simplify or otherwise facilitate in mobile commerce according to some aspects of the present disclosure.

FIG. 3 is a flow chart illustrating an example of a process 300 for using the mobile commerce facilitation system 110 to simplify or otherwise facilitate mobile commerce according to some aspects of the present disclosure. For illustrative purposes, the process 300 is described with reference to implementations described above with respect to FIGS. 1-2. Other implementations, however, are possible. In some aspects, the steps in FIG. 3 may be implemented in program code that is executed by a group of processors or a single processor such as, for example, the processor 202 of FIG. 2. In some aspects of the present disclosure, one or more steps shown in FIG. 3 may be omitted or performed in a different order. Similarly, additional steps not shown in FIG. 3 may be performed.

The process 300 involves the processor 202 receiving a data network identifier or other identifier from a commerce application 108, as depicted at block 302. The data network identifier can be associated with a mobile device conducting a transaction with the commerce application 108. The processor 202 can execute the facilitation application 119 and thereby perform one or more operations for receiving a data network identifier from a commerce application 108. For example, the facilitation application 119 can open a server port or transmit a query to the provider system 106 executing the commerce application 108. The provider system 106 can responsively transmit a data network identifier to the mobile commerce facilitation system 110 via data network 130. In some aspects, the provider system 106 can "push" (i.e., transmit data without specifically receiving a request for the data) the data network identifier to the mobile commerce facilitation system 110.

The process 300 also involves the processor 202 obtaining a credential associated with a mobile device using the data network identifier, as depicted at block 304. The processor 202 can execute the facilitation application 119 and thereby perform one or more operations for obtaining a credential associated with the mobile device using the data network identifier. For example, the facilitation application 119 can configure the network interface 208 to transmit data associated with the data network identifier to a telecommunication system 122. The facilitation application 119 can establish and transmit the data to the telecommunication system 122 over a secure data connection. The telecommunication system 122 can receive the data network identifier and determine an associated credential from one or more data sources 124. For instance, the telecommunication system 122 can receive a data network identifier including an IP address and determine an associated credential including a social security number. The telecommunication system 122 can transmit the credential to the mobile commerce facilitation system 110. The telecommunication system 122 can also transmit other information to the mobile commerce facilitation system 110. The other information can include an account status (active, suspended, blacklisted, etc.), a mobile phone number, Subscriber Identity Module ("SIM") card information, etc. The mobile commerce facilitation system 110 can receive the credential and other information. The mobile commerce facilitation system 110 can store the credential and other information in memory 210.

The process 300 also involves the processor 202 retrieving identification information from a credit file associated with the credential, as depicted at block 306. The identification information can be usable for completing the transaction. The processor 202 can execute the facilitation application 119 and thereby perform one or more operations for retrieving identification information from a credit file associated with the credential. For example, the facilitation application 119 can compare the credential received from the telecommunication system 122 with the data stored in one or more data sources 112 (e.g., credit data 114) to determine an associated credit file that includes a corresponding credential. The facilitation application 119 can retrieve identification information from the credit file.

The process 300 also involves the processor 202 transmitting the identification information to a computing device executing the commerce application 108, as depicted in block 308. The processor 202 can execute the facilitation application 119 and thereby perform one or more operations for transmitting the identification information to a computing device executing the commerce application 108. For example, the facilitation application 119 can configure the network interface 208 to transmit a suitable electronic communication (e.g., an Extensive Markup Language ("XML") document, a web page, an e-mail, etc.) to one or more provider systems 106 executing the commerce application 108.

In additional or alternative aspects, the processor 202 may access stored information about one or more third party lenders. For example, a third party lender (e.g., a bank, trust, insurance agency, or provider of goods or services) may have previously transmitted one or more business rules to the mobile commerce facilitation system 110 that identify how the third party lender makes decisions about prospective borrowers. The mobile commerce facilitation system 110 can use the identification information or data retrieved from credit data 114 with the one or more business rules to determine which financial products or services may be available to the client from the third party. Financial products or services can include credit cards, loans, store cards, bank accounts, driver's license or insurance cards, etc. The mobile commerce facilitation system 110 can provide the information about the available financial products or services to the client via the facilitation application 119.

In some aspects, the processor 202 may access stored information about other third parties. For example, a third party provider may have previously transmitted one or more business rules to the mobile commerce facilitation system 110 that identify how the third party provider makes decisions about selling or manufacturing a product. The mobile commerce facilitation system 110 can use the identification information or data retrieved from credit data 114 with the one or more business rules to determine which products or services may be available to the client from the third party provider. The mobile commerce facilitation system 110 can provide the information about the available products or services to the client via the facilitation application 119.

Figure 4:
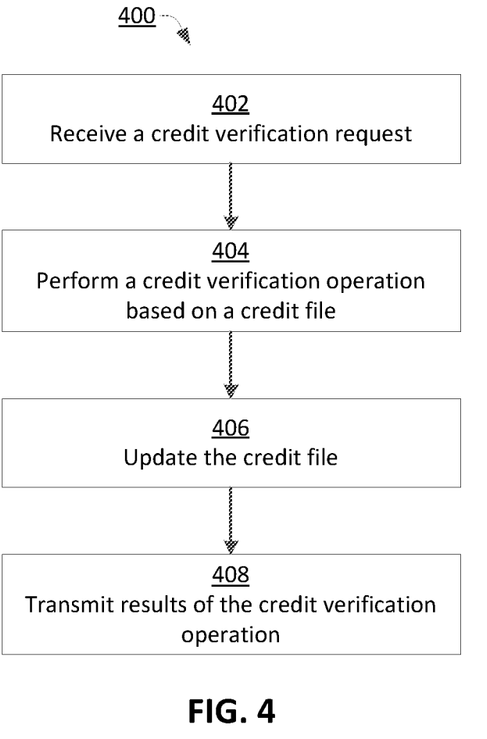
FIG. 4 is a flow chart illustrating an example of a process for using the mobile commerce facilitation system of FIGS. 1 and 2 to engage in a credit verification operation according to some aspects of the present disclosure.

FIG. 4 is a flow chart illustrating an example of a process 400 for using the mobile commerce facilitation system of FIG. 1 to engage in a credit application and/or verification operation according to some aspects of the present disclosure. For illustrative purposes, the process 400 is described with reference to implementations described above with respect to FIGS. 1-2. Other implementations, however, are possible. In some aspects, the steps in FIG. 4 may be implemented in program code that is executed by a group of processors or a single processor such as, for example, the processor 202 of FIG. 2. In some aspects of the present disclosure, one or more steps shown in FIG. 4 may be omitted or performed in a different order. Similarly, additional steps not shown in FIG. 4 may be performed.

The process 400 involves the processor 202 configuring the network interface 208 to receive a credit verification request, as depicted at block 402. The processor 202 can receive the credit verification request from a commerce application 108. In some aspects, the credit verification request can include identification information. For example, the credit verification request can include the name or social security number of a client. The processor 202 can execute the facilitation application 119 and thereby perform one or more operations for receiving the credit verification request. For example, the facilitation application 119 can configure the network interface 208 to open a server port or transmit a query to a provider system 106 executing the commerce application 108. The provider system 106 can responsively transmit the credit verification request to the mobile commerce facilitation system 110 via data network 130. In some aspects, the provider system 106 can "push" the credit verification request to the mobile commerce facilitation system 110.

In some aspects, the credit verification request can be transmitted with a data network identifier instead of or in addition to identification information. The processor 202 can interact with a telecommunication system 122 to obtain a credential associated with the data network identifier, as described in block 304 of FIG. 3. The processor 202 can identify a credit file associated with the credential, as described in block 306 of FIG. 3.

The process 400 also involves the processor 202 performing a credit application and/or verification operation based on the credit file, as depicted at block 404. The processor 202 can execute the facilitation application 119 and thereby perform one or more operations for performing the credit application and/or verification operation. For example, as described above, the mobile commerce facilitation system 110 can include credit data 114. The facilitation application 119 can analyze the credit data 114 to determine a credit file associated with the received identification information or credential. The facilitation application 119 can use data from the credit file to perform the credit application and/or verification operation. In some aspects, the credit application and/or verification operation can include verifying the identity of the client, verifying the relationship of the client to an account, performing fraud detection, pre-screening the client for one or more products or services, etc. An example of a credit application and/or verification operation is further described below with respect to FIG. 5.

In some aspects, the credit application and/or verification operation can include transmitting a challenge question (i.e., a security question) to the provider system 106 or the client system 102. For example, the processor 202 may transmit a challenge question to the client system 102 to confirm the identity of the client. The facilitation application 119 can receive a response from the provider system 106 or the client system 102. Based on the response, the facilitation application 119 can perform one or more functions. For example, the facilitation application 119 can configure the network interface 208 to transmit data (e.g., a warning, a validation code, a denial code, etc.) to the provider system 106 or the client system 102, continue the credit application and/or verification operation, or terminate the credit application and/or verification operation.

The process 400 also involves the processor 202 updating the credit file, as depicted at block 406. The processor 202 can update the credit file to include at least some of the identification information. The processor 202 can execute the facilitation application 119 and thereby perform one or more operations for updating the credit file. For example, the facilitation application 119 can update the credit file with one or more addresses, phone numbers, interests, credit card numbers, income levels or bands (e.g., "$50,000 to $60,000"), educational levels (e.g., "bachelor's degree), or other attributes of the client. In some aspects, the mobile commerce facilitation system 110 may not be authorized to update the credit file. In these cases, block 406 can be omitted.

The process 400 also involves the processor 202 transmitting the results of the credit verification operation, as depicted at block 408. The results can include a fraud detection warning, a denial code, an approval code, information about products or services (e.g., financial or other products or services) for which a client may be eligible, or other information. The processor 202 can execute the facilitation application 119 and thereby perform one or more operations for transmitting the results of the credit verification operation. For example, the facilitation application 119 can configure the network interface 208 to transmit the results of the credit verification operation to the client system 102 or the provider system 106.

In some aspects, information for the individual can be retrieved and used by a mobile commerce application to pre-fill an application for the user.

Figure 5:
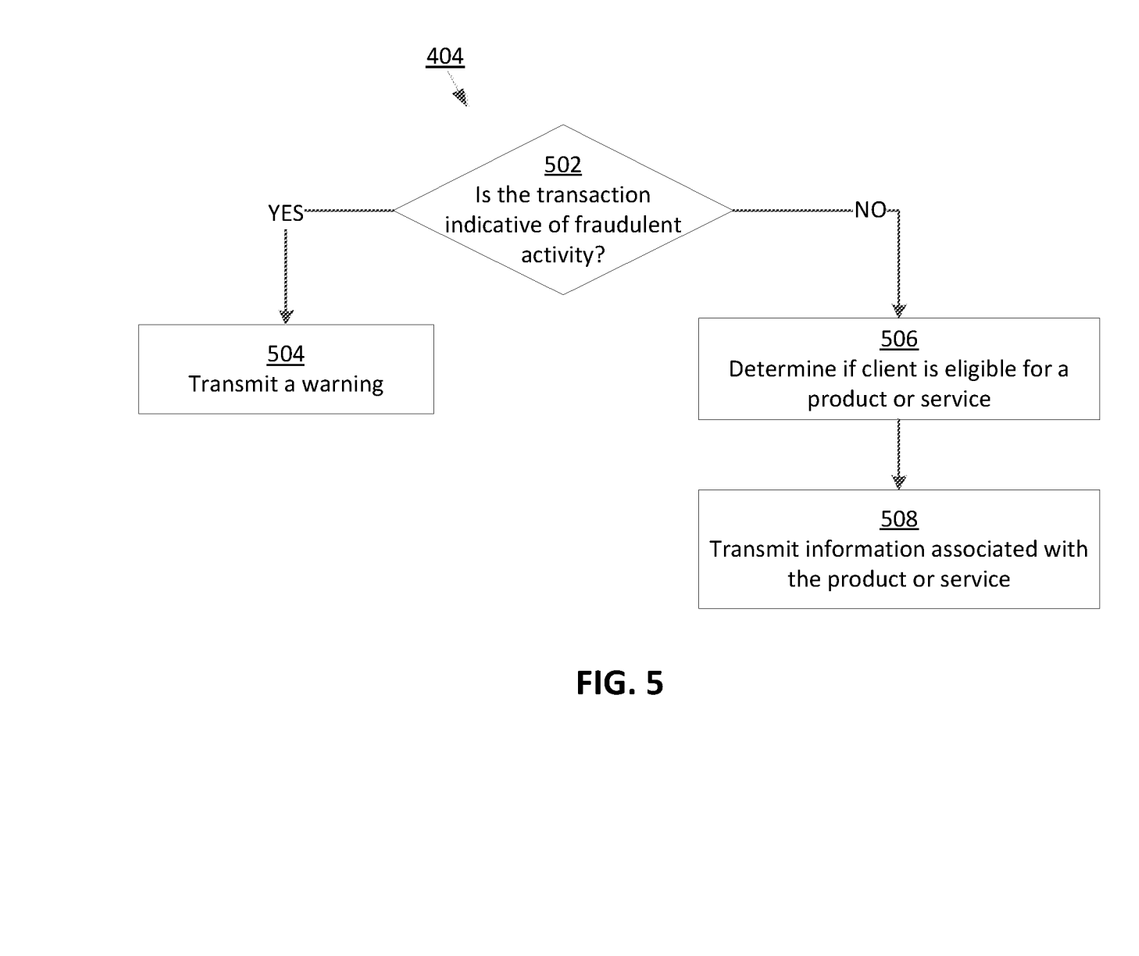
FIG. 5 is a flow chart illustrating an example of a process for performing the credit verification operation of FIG. 4 according to some aspects of the present disclosure.

FIG. 5 is a flow chart illustrating an example of a process 500 for performing the credit verification operation of FIG. 4 according to some aspects of the present disclosure. For illustrative purposes, the process 500 is described with reference to implementations described above with respect to FIGS. 1-2. Other implementations, however, are possible. In some aspects, the steps in FIG. 5 may be implemented in program code that is executed by a group of processors or a single processor such as, for example, the processor 202 of FIG. 2. In some aspects of the present disclosure, one or more steps shown in FIG. 5 may be omitted or performed in a different order. Similarly, additional steps not shown in FIG. 5 may be performed.

The process 500 involves the processor 202 determining whether a transaction is indicative of fraudulent activity, as depicted at block 502. The processor 202 can execute the fraud detection application 120 and thereby perform one or more operations for determining whether a transaction is indicative of fraud. For example, the fraud detection application 120 can compare credit data 114 or account data 116 with data provided by the client system 102, provider system 106, or telecommunication system 122. For instance, the fraud detection application 120 can compare credit data 114 with a legal name, a portion of (or all of) the client's social security number, or both provided by the telecommunication system 122. The fraud detection application 120 can use the results of this comparison to detect data inaccuracies or questionable transaction behavior. In some aspects, the fraud detection application 120 can execute one or more algorithms or apply a set of rules using such data to detect fraud. For example, the fraud detection application 120 can execute one or more algorithms using credit data 114 to detect the presence of fraud. The fraud detection application 120 can determine both fraudulent transaction patterns and velocity.

If the transaction is indicative of fraudulent activity, the process 500 involves the processor 202 transmitting a warning, as depicted in block 504. The processor 202 can execute the fraud detection application 120 and thereby perform one or more operations for transmitting a warning. For example, the fraud detection application 120 can generate a warning or other alert message. The fraud detection application 120 can configure the network interface 208 to transmit a signal to the provider system 106 or the client system 102 that includes the warning or other alert message. In some aspects, the provider system 106 or the client system 102 can terminate the transaction in response to receiving the warning or other alert message.

If the transaction is not indicative of fraudulent activity, the process 500 involves the processor 202 determining if a client is eligible for a product or service. The processor 202 can execute the facilitation application 119 and thereby perform one or more operations for determining if a client is eligible for a product or service. For example, the facilitation application 119 can execute an algorithm or apply a set of rules using data about the client (e.g., data associated with the client's income, address, zip code, credit, age, gender, assets, investment style, demographic, behaviors, attitudes, or spending patterns). The results can indicate if a client is eligible for a product or service (i.e., "prescreen" the client). Examples of the product or service include (but is not limited to) a credit card, store card, loan, a bank loan, an auto loan, or other product or service.

In additional or alternative aspects, the processor 202 can execute an algorithm or apply a set of rules using data about the client to determine an advertisement or other marketing tool to deliver to the client. The processor 202 can execute the facilitation application 119 and thereby perform one or more operations for determining an advertisement or other marketing tool to deliver to the client. For example, the facilitation application 119 can execute an algorithm using the client's gender, age, and spending patterns to determine an appropriate advertisement to provide to the client.

The process 500 also involves the processor 202 transmitting information associated with the product or service, as depicted at block 508. The information associated with the product or service can include a name, a uniform resource locator ("URL") or other website address, a description, a temporary credit card or store card number, a coupon or discount (e.g., a discount code or bar code), an initial or fixed credit limit, etc. The processor 202 can execute the facilitation application 119 and thereby perform one or more operations for transmitting information associated with the product or service. For example, the facilitation application 119 can configure the network interface 208 to transmit one or more signals including the information associated with the product or service to the client system 102 or the provider system 106. In some aspects, the provider system 106 can provide the information to the client with or without additional information (e.g., information about a similar product or service, a rating of the product or service, or a review of the product or service).

In additional or alternative aspects, the processor 202 can configure the network interface 208 to transmit one or more signals that include information associated with the advertisement or marketing tool. The processor 202 can execute the facilitation application 119 and thereby perform one or more operations for transmitting information associated with the advertisement or marketing tool. For example, the facilitation application 119 can generate the information associated with the advertisement or marketing tool. The facilitation application 119 can configure the network interface 208 to transmit the generated information to the client system 102 or the provider system 106. In some aspects, the provider system 106 can provide the information to the client with or without additional information (e.g., videos, links, or images).

Figure 6:
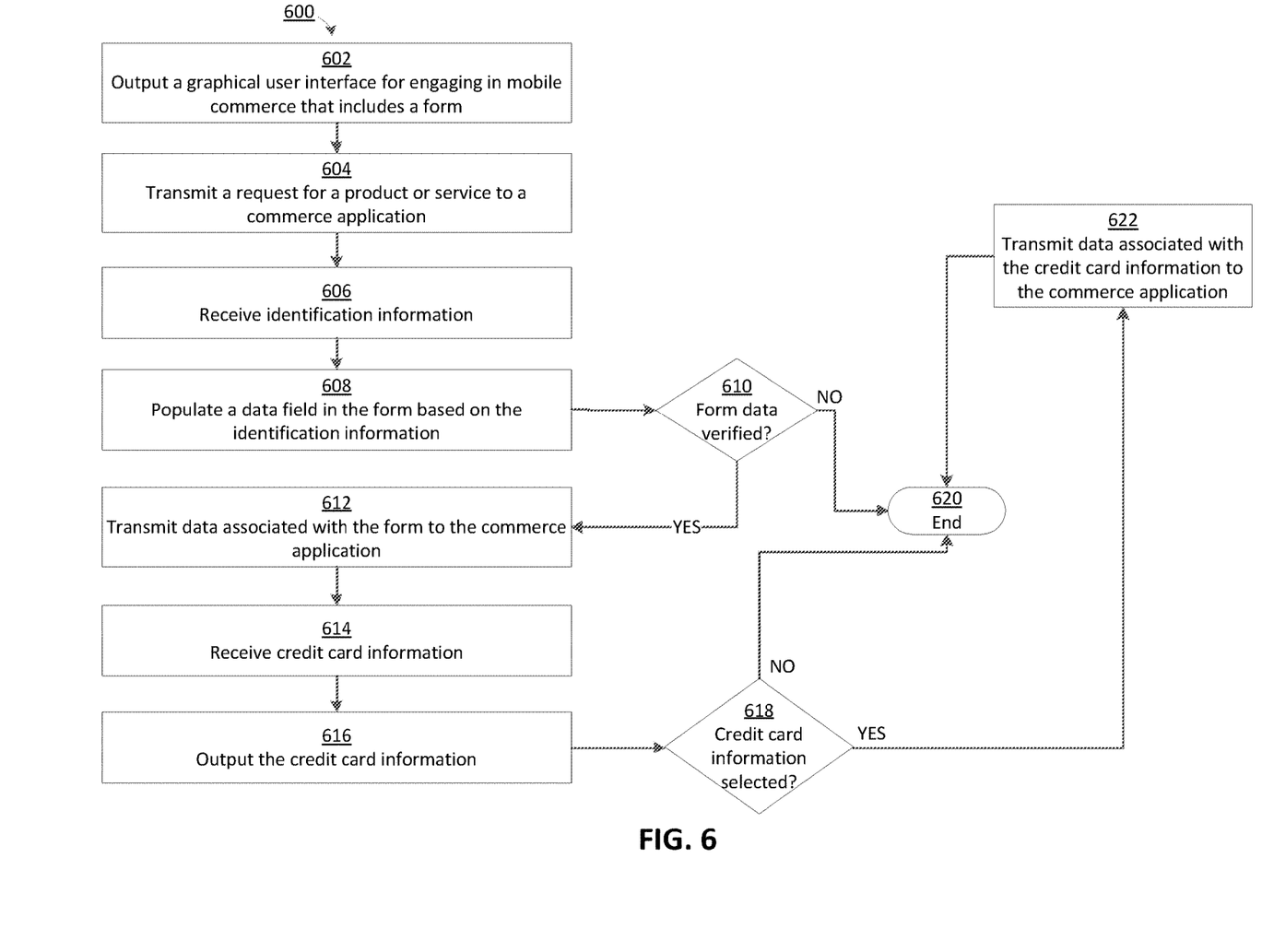
FIG. 6 is a flow chart illustrating an example of a process for using the client system of FIG. 1 to engage in mobile commerce according to some aspects of the present disclosure.

FIG. 6 is a flow chart illustrating an example of a process 600 for using the client system 102 to engage in mobile commerce according to some aspects of the present disclosure. For illustrative purposes, the process 600 is described with reference to implementations described above with respect to FIGS. 1-2. Other implementations, however, are possible. In some aspects, the steps in FIG. 6 may be implemented in program code that is executed by a group of processors or a single processor. In some aspects of the present disclosure, one or more steps shown in FIG. 6 may be omitted or performed in a different order. Similarly, additional steps not shown in FIG. 6 may be performed.

The process 600 involves the client system 102 outputting a graphical user interface ("GUI") for engaging in mobile commerce, as depicted at block 602. The graphical user interface can include a form (e.g., a purchase order form). A client can interact with the GUI to engage in mobile commerce with a provider. For example, a client can select an item for purchase from the provider via the GUI. The client system 102 can detect the item selection and generate the purchase order form.

The process 600 also involves the client system 102 transmitting a request for the product or service via data network 130 to a commerce application 108, as depicted at block 604. In some aspects, the client system 102 can establish and transmit the request to the provider system 106 over a secure data connection. For example, the client system 102 can configure the network interface 208 to transmit a signal including a query to the provider system 106 executing the commerce application 108. The query can be transmitted from the client system 102 to the provider system 106 via an encrypted connection. The provider system 106 can receive the request for the product or service. The provider system 106 can respond to the query by transmitting identification information to the client system 102.

The process 600 also involves the client system 102 receiving the identification information, as depicted at block 606. For example, the client system 102 can configure the network interface 208 to receive identification information including a name, geographical address, zip code, e-mail address, phone number, social security number, etc. associated with the client. The client system 102 can also receive other information, such as a merchant ID number, client ID number, campaign ID number, purchase order ID number, a cart balance, a challenge question, a fraud warning or alert, etc.

The process 600 also involves the client system 102 populating one or more data fields in the form based on the identification information, as depicted at block 608. For example, the client system 102 can fill in a name field with a name. As another example, the client system 102 can fill in an address field with an address.

The process 600 also involves the client system 102 determining if the form data has been verified, as depicted at block 610. In some aspects, the client system 102 can prompt the client to verify the form data. If the client verifies the form data, the process 600 can continue to block 612. The client system 102 can receive an input via the GUI (e.g. a button in the GUI being clicked) that is indicative of the form data being verified. If the client does not verify the form data, the process 600 can terminate at block 620.

The process 600 also involves the client system 102 transmitting data associated with the form to the commerce application 108, as depicted at block 612. In some aspects, the client system 102 can receive an input via the GUI that is indicative of the user submitting the form data. In response, the client system 102 can transmit data associated with the form to the commerce application 108. In other aspects, the client system 102 can transmit data associated with the form to the commerce application without direction from the client.

In some aspects, the provider system 106 can receive the data associated with the form. The provider system 106 can responsively obtain credit card information. For example, the provider system 106 can transmit data associated with the transaction or the client system 102 to the mobile commerce facilitation system 110. The mobile commerce facilitation system 110 can determine and provide credit card information to the provider system 106. The provider system 106 can transmit the credit card information to the client system 102.

The process 600 can involve the client system 102 receiving the credit card information, as depicted at block 614. The credit card information can include one or more credit card numbers or portions of credit card numbers. The credit card information can also include an expiration date, security code, registered owner, billing address, type or brand, or other information associated with each credit card number.

The process 600 can involve the client system 102 outputting the credit card information, as depicted at block 616. The client system 102 can output, via the GUI, all or a portion of the credit card information. For example, the client system 102 can output a list of one or more available credit card numbers for the client to use in the transaction. The credit card numbers can be entirely visible or partially hidden (e.g., the first 12 digits can be hidden while the last four digits can be visible). The client system 102 can also output one or more of an expiration date, security code, registered owner, billing address, type or brand, or other information associated with each credit card number.

In some aspects, the client system 102 can rearrange the order of the credit card numbers in the list of credit card numbers from the order in which they were received. In other aspects, the client system 102 can allow the client to rearrange (e.g., via the GUI) the order of the credit card numbers. For example, the client system 102 can include a touch-screen display. The client system 102 can determine that an interaction (e.g., a tap or gesture) with the touch-screen display indicates a selection of a credit card number. The client system 102 can select a credit card number indicated by the interaction in response to the client system 102 receiving the interaction. The client system 102 can also identify that an interaction with a GUI object (e.g., an "up" arrow or a "down" arrow) is indicative of a command to change the order of credit card numbers in the list. The client system 102 can change a position of the credit card number (e.g., up or down) in the list of credit card numbers based on the interaction with the GUI object.

In some aspects, the client system 102 can receive information (e.g., from the provider system 106 or the mobile commerce facilitation system 110) associated with a product or service for which the client has been deemed eligible. The client system 102 can output the information, for example, via the GUI. In some aspects, the client system 102 can receive an input via the GUI indicating that the client wants to purchase the product or service. The client system 102 can transmit data associated with the choice to purchase the product or service to the provider system 106 or the mobile commerce facilitation system 110. In some aspects, the provider system 106 or the mobile commerce facilitation system 110 can receive the data associated with the choice to purchase the product or service and add the product or service to the client's order.

The process 600 can involve the client system 102 determining if credit card information has been selected, as depicted at block 618. For example, the client system 102 can determine if the client has selected a credit card number from the list of credit card numbers for use in the transaction. If the client system 102 determines that the client has not selected credit card information, the process 600 can terminate at block 620. If the client system 102 determines that the client has selected credit card information, then the process 600 can involve transmitting data associated with the credit card information to the commerce application 108, as depicted at block 622. For example, the client system 102 can transmit a selected credit card number, and an associated security code, billing address, and expiration date to the commerce application 108.

In some aspects, the commerce application 108 can receive the credit card information and complete the transaction. For example, the commerce application 108 can add the order to a fulfillment database. The commerce application 108 can also generate a receipt and provide the receipt to the client (e.g., via e-mail, a webpage, or by other means).

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Aspects of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific aspects thereof, it will be appreciated that those skilled in the art, upon attaining an understanding of the foregoing, may readily produce alterations to, variations of, and equivalents to such aspects. Any aspects or examples may be combined with any other aspects or examples. Accordingly, it should be understood that the present disclosure has been presented for purposes of example rather than limitation, and does not preclude inclusion of such modifications, variations, and/or additions to the present subject matter as would be readily apparent to one of ordinary skill in the art.

The invention claimed is:

1. A system comprising:
an electronic commerce computing system configured for performing an electronic transaction involving communications with a mobile device;
a commerce facilitation server communicatively coupled to the electronic commerce computing system via a data network, wherein the commerce facilitation server is configured for:
   establishing a first network connection between the commerce facilitation server and the electronic commerce computing system during the electronic transaction between with the electronic commerce computing system and the mobile device;
   receiving a network identifier from the electronic commerce computing system via the first network connection, wherein the network identifier comprises one or more of an IP address of the mobile device or SIM card information of the mobile device;
   obtaining a credential associated with the mobile device from a telecommunication computing system, the credential identifying an individual that is associated with a telecommunications account of the mobile device;
   comparing the credential to first credit account data in a first data source coupled to the commerce facilitation server, the first credit account data associated with personal information of the individual;
   selecting, based on determining that the credential obtained from the telecommunication computing system corresponds to an additional credential included in the first credit account data and based on a credit card number being required for completing the electronic transaction, the credit card number from second credit account data in a second data source coupled to the commerce facilitation server, wherein the first credit account data is linked to the second credit account data, wherein the first credit account data comprises one or more of a name of a consumer and a social security number associated with the consumer, wherein the second credit account data comprises a credit file for the consumer, and wherein the first credit account data is linked to the second credit account data via at least matching the one or more of the name and the social security number to the credit file; and
   transmitting the credit card number to the electronic commerce computing system prior to a completion of the electronic transaction between the electronic commerce computing system and the mobile device; and
the telecommunication computing system communicatively coupled to the commerce facilitation server via the data network, the telecommunication computing system configured for:
   authenticating the commerce facilitation server,
   matching the network identifier to the credential, and
   transmitting the credential to the commerce facilitation server based on authenticating the commerce facilitation server and matching the network identifier to the credential,
wherein the electronic commerce computing system is further configured for (i) updating a graphical interface to present at least a portion of the credit card number during the electronic transaction and (ii) providing, to the mobile device and during the electronic transaction, the graphical interface with the credit card number.

2. The system of claim 1, wherein the commerce facilitation server is further configured for:
- storing the first credit account data at the first data source and the second credit account data at the second data source; and
- linking the first credit account data in the first data source to the second credit account data in the second data source via a referential keying system.

3. The system of claim 1, wherein the commerce facilitation server is further configured for performing, prior to receiving the network identifier from the electronic commerce computing system:
- receiving a credit verification request for the individual, wherein the credit verification request includes at least some of the first credit account data or the second credit account data;
- performing, based on a credit file stored in one or more of the first data source or the second data source, a credit verification operation in response to receiving the credit verification request; and
- updating one or more of the first data source or the credit file with the at least some of the first credit account data or the second credit account data.

4. The system of claim 1, wherein the commerce facilitation server is further configured for:
- responsive to determining that the electronic transaction between the commerce facilitation server and the mobile device is not indicative of fraudulent activity associated with the individual, determining an eligibility of the individual for a product or service.

5. The system of claim 1, wherein the commerce facilitation server is further configured for:
- responsive to determining that an additional electronic transaction between the commerce facilitation server and the mobile device is indicative of fraudulent activity, transmitting a warning to the electronic commerce computing system to terminate the additional electronic transaction.

6. The system of claim 1, wherein the commerce facilitation server is further configured for encrypting the credit card number prior to transmitting the credit card number to the electronic commerce computing system, wherein the credit card number, as encrypted, is transmitted via the first network connection.

7. The system of claim 1, wherein the network identifier further comprises a phone number of the mobile device.

8. The system of claim 1, wherein the electronic commerce computing system is further configured for:
- presenting the graphical interface to the mobile device prior to transmitting the network identifier to the commerce facilitation server;
- receiving, via the graphical interface, a request from the mobile device that requires, for completion, identification data specific to a user of the mobile device, the identification data including the credit card number;
- querying the commerce facilitation server for the identification data; and
- receiving the identification data, with the credit card number, from the commerce facilitation server, wherein updating the graphical interface to present at least the portion of the credit card number during the electronic transaction comprises populating the graphical interface with the identification data.

9. The system of claim 8, wherein the electronic commerce computing system is configured for populating the graphical interface with the identification data without receiving the identification data from the mobile device.

10. A non-transitory computer-readable medium storing instructions that are executable by processing devices of a system comprising an electronic commerce computing system, a commerce facilitation server, and a telecommunication computing system, wherein the instructions, when executed by the processing devices, cause the processing devices to perform operations comprising:
- performing, by the electronic commerce computing system, an electronic transaction involving communications with a mobile device;
- performing, by the commerce facilitation server:
  - establishing a first network connection between the commerce facilitation server and the electronic commerce computing system during the electronic transaction between with the electronic commerce computing system and the mobile device;
  - receiving a network identifier from the electronic commerce computing system via the first network connection, wherein the network identifier comprises one or more of an IP address of the mobile device or SIM card information of the mobile device;
  - obtaining a credential associated with the mobile device from the telecommunication computing system, the credential identifying an individual that is associated with a telecommunications account of the mobile device;
  - comparing the credential to first credit account data in a first data source coupled to the commerce facilitation server, the first credit account data associated with personal information of the individual;
  - selecting, based on determining that the credential obtained from the telecommunication computing system corresponds to an additional credential included in the first credit account data and based on a credit card number being required for completing the electronic transaction, the credit card number from second credit account data in a second data source coupled to the commerce facilitation server, wherein the first credit account data is linked to the second credit account data, wherein the first credit account data comprises one or more of a name of a consumer and a social security number associated with the consumer, wherein the second credit account data comprises a credit file for the consumer, and wherein the first credit account data is linked to the second credit account data via at least matching the one or more of the name and the social security number to the credit file; and
  - transmitting the credit card number to the electronic commerce computing system prior to a completion of the electronic transaction between the electronic commerce computing system and the mobile device;
- performing, by the telecommunication computing system:
  - authenticating the commerce facilitation server,
  - matching the network identifier to the credential, and
  - transmitting the credential to the commerce facilitation server based on authenticating the commerce facilitation server and matching the network identifier to the credential; and
- performing, by the electronic commerce computing system:
  - updating a graphical interface to present the credit card number during the electronic transaction, and
  - providing, to the mobile device and during the electronic transaction, the graphical interface with at least a portion of the credit card number.

11. The non-transitory computer-readable medium of claim 10, wherein the operations further comprise the commerce facilitation server:
- storing the first credit account data at the first data source and the second credit account data at the second data source; and
- linking the first credit account data in the first data source to the second credit account data in the second data source via a referential keying system.

12. The non-transitory computer-readable medium of claim 10, wherein the operations further comprise the commerce facilitation server, prior to receiving the network identifier from the electronic commerce computing system:
- receiving a credit verification request for the individual, wherein the credit verification request includes at least some of the first credit account data or the second credit account data;
- performing, based on a credit file stored in one or more of the first data source or the second data source, a credit verification operation in response to receiving the credit verification request; and
- updating one or more of the first data source or the credit file with the at least some of the first credit account data or the second credit account data.

13. The non-transitory computer-readable medium of claim 10, wherein the operations further comprise the commerce facilitation server determining, responsive to whether the electronic transaction between the commerce facilitation server and the mobile device is not indicative of fraudulent activity associated with the individual, determining an eligibility of the individual for a product or service.

14. The non-transitory computer-readable medium of claim 10, wherein the operations further comprise the commerce facilitation server:
- responsive to determining that an additional electronic transaction between the commerce facilitation server and the mobile device is indicative of fraudulent activity, transmitting a warning to the electronic commerce computing system to terminate the additional electronic transaction.

15. The non-transitory computer-readable medium of claim 10, wherein the operations further comprise the commerce facilitation server encrypting the credit card number prior to transmitting the credit card number to the electronic commerce computing system, wherein the credit card number, as encrypted, is transmitted via the first network connection.

16. The non-transitory computer-readable medium of claim 10, wherein the network identifier further comprises a phone number of the mobile device.

17. The non-transitory computer-readable medium of claim 10, wherein the operations further comprise the electronic commerce computing system:
- presenting the graphical interface to the mobile device prior to transmitting the network identifier to the commerce facilitation server;
- receiving, via the graphical interface, a request from the mobile device that requires, for completion, identification data specific to a user of the mobile device, the identification data including the credit card number;
- querying the commerce facilitation server for the identification data; and
- receiving the identification data, with the credit card number, from the commerce facilitation server, wherein updating the graphical interface to present at least the portion of the credit card number during the electronic transaction comprises populating the graphical interface with the identification data.

18. The non-transitory computer-readable medium of claim 17, wherein the electronic commerce computing system populates the graphical interface with the identification data without receiving the identification data from the mobile device.

* * * * *